United States Patent [19]

Barth

[11] Patent Number: 5,328,213
[45] Date of Patent: Jul. 12, 1994

[54] ADJUSTABLE PIPE FITTING
[75] Inventor: James T. Barth, Plano, Tex.
[73] Assignee: Eljer Industries, Inc., Dallas, Tex.
[21] Appl. No.: 986,791
[22] Filed: Dec. 8, 1992
[51] Int. Cl.$^5$ ............................................. F16L 21/00
[52] U.S. Cl. .................................. 285/138; 285/175; 285/181; 285/424
[58] Field of Search ....................... 285/184, 138, 133.1, 285/424, 181, 127, 175

[56] References Cited

U.S. PATENT DOCUMENTS

| Re. 8,885 | 9/1879 | Henis . | |
|---|---|---|---|
| 9,968 | 8/1853 | Finch, Jr. . | |
| 142,879 | 9/1873 | Weaver . | |
| 704,936 | 7/1902 | Scherer . | |
| 861,409 | 7/1907 | Wagner . | |
| 1,146,781 | 7/1915 | Bowdoin | 285/184 X |
| 1,467,833 | 9/1923 | Bovee . | |
| 1,665,655 | 4/1928 | Clisson | 285/133.1 X |
| 1,708,528 | 4/1929 | Voelker . | |
| 1,726,531 | 9/1929 | Andel . | |
| 1,808,450 | 6/1931 | Burgess . | |
| 2,756,076 | 7/1956 | Rodriguez, Jr. | 285/4 |
| 2,910,308 | 10/1959 | Carr | 285/138 X |
| 4,627,646 | 12/1986 | Kessel | 285/114 |

FOREIGN PATENT DOCUMENTS

| 779680 | 6/1936 | France | 285/133.1 |
|---|---|---|---|
| 264788 | 2/1950 | Switzerland | 285/184 |

OTHER PUBLICATIONS

Thor catalog No. 101 May 1961.

Primary Examiner—Dave W. Arola
Attorney, Agent, or Firm—Richards, Medlock & Andrews

[57] ABSTRACT

The adjustable pipe fitting of the invention has double walls in accordance with Type B standards established by the American National Standards Institute and Underwriters Laboratories. In the preferred embodiment, the invention comprises a main conduit having three sections which are rotatably coupled together. A branch conduit is securely connected to the main conduit so that fluid communication exists between the branch and main conduits. The branch conduit also comprises three sections which are rotatably coupled together. The main conduit sections and the branch sections are coupled together at oblique angles relative to their respective longitudinal axes to provide a means for adjusting the fitting to accommodate connector pipes having various angles and orientations.

4 Claims, 4 Drawing Sheets

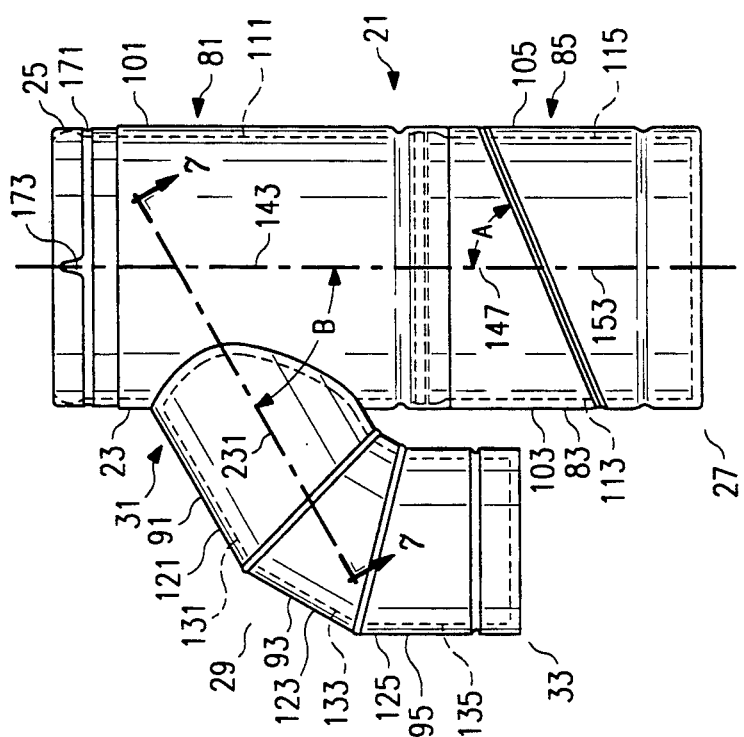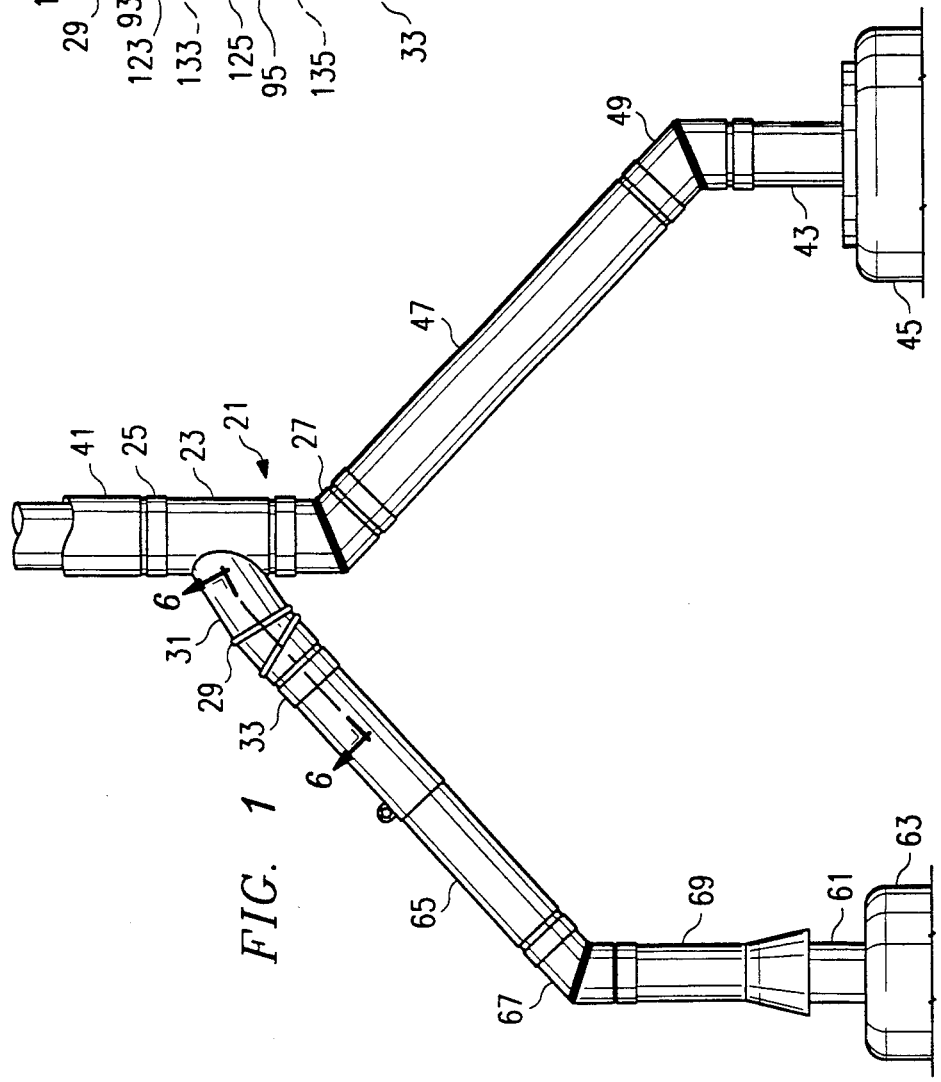

ADJUSTABLE PIPE FITTING

TECHNICAL FIELD OF THE INVENTION

This invention relates in general to connector fittings for pipe systems, and more particularly, to an adjustable, double wall pipe fitting which is useful for connecting two or more misaligned pipes.

BACKGROUND OF THE INVENTION

A problem often encountered in the design and construction of pipe systems is the difficulty of routing inflexible lengths of pipe along paths which change direction. Also, to avoid obstacles in the path of the pipe, it is often necessary to connect pipe sections at angles, complicating the task of connecting the pipes. Further misalignment of the individual pipe sections can make it very difficult to connect them together to complete the system.

Difficulties of connecting pipe sections typically arise in the construction of heating, ventilating, and air conditioning systems for residential and commercial buildings. For example, building codes require that all gas-burning appliances, such as furnaces and water heaters, must be adequately vented so that combustion products are safely channeled outside the building. At the same time, it is desirable to minimize the number of vent pipes extending through the roof or exterior wall of a house or building. Therefore, two or more appliances are often vented through a common exhaust vent. However, the connector pipes which join each appliance to the common vent must be routed around structural members and other obstacles within the building. This causes the connector pipes to meet the common vent pipe at odd angles, making connection to the common vent pipe difficult. Furthermore, because locations of the appliances can vary, as can the location of the common vent and other structures within the building, no two installations are exactly alike.

The situation is further complicated by the increased use of newer, mid-efficiency gas appliances, which have efficiencies of 78 to 83 percent and which are commonly referred to as "fan assisted appliances." With these appliances it is very important to minimize the heat loss through the walls of the vent pipes in order to prevent the formation of excessive condensation within the system. Consequently, many building codes will soon require gas vent systems to be constructed in accordance with "Type B" vent pipe guidelines established by the American National Standards Institute ("ANSI"), Underwriters Laboratories ("UL") and other national and local building codes. To meet ANSI/UL Type B standards, vent pipe must have double walls with an air space between the walls to increase resistance to heat conduction through the pipe. Of course, all connector fittings used in such systems must meet ANSI/UL Type B standards as well.

Previous attempts to solve the problem of connecting misaligned pipes include the use of various combinations of numerous conventional fittings, such as elbows and tees having many different angles and sizes. The fittings are pieced together at the job site in an effort to find the right combination which will complete the connection. However, because the fittings are only available in predetermined angles and sizes, the connections sometimes cannot easily be made. In addition, when the connection is made, the numerous fittings tend to take up an excessive amount of space and can reduce the slope of the connector pipe running from the appliance to the common vent. The reduced slope is a disadvantage because it makes venting less efficient. In addition, the installer is forced to maintain a large stock of fittings for each job.

The prior art discloses various adjustable pipe fittings which are intended to alleviate the pipe connection problem. For example, U.S. Pat. Nos. Re.8,885; 704,936; 1,467,833; 1,708,528; and 1,808,450 disclose adjustable elbow fittings. U.S. Pat. No. 861,409 discloses an adjustable tee fitting designed to accommodate different angular orientations of a branch pipe. U.S. Pat. No. 4,627,646 discloses various types and combinations of adjustable fittings. However, none of these adjustable fittings have the double wall construction necessary to comply with ANSI/UL Type B standards for venting mid-efficiency gas appliances.

Thus, a need exists for a pipe fitting having double walls separated by an air space, as required by ANSI/UL Type B standards, and which is readily adjustable to join two or more connector pipes having various orientations.

SUMMARY OF THE INVENTION

The invention disclosed and claimed herein is an adjustable pipe fitting for connecting the ends of two or more randomly oriented pipe sections. The fitting has double walls and does not require the use of clamps, brackets or other such fasteners to hold its components together.

In a first embodiment, the invention comprises a generally cylindrical main conduit which has at least two sections. The ends of the sections are coupled together in a plane which forms an oblique angle with the longitudinal axis of the main conduit so that the sections can rotate relative to each other. The term "oblique angle" as used herein means an angle which is neither perpendicular nor parallel. Each section comprises an inner tubular member and a concentric outer tubular member which together form the double walls of the main conduit. Because the sections are coupled together at an oblique angle, as one section is rotated relative to the other, the fitting can be adjusted to accommodate various angles and orientations of connector pipes.

In another embodiment, the main conduit comprises at least three sections, each of which includes an inner tubular member and a concentric outer tubular member. The first section is rotatably coupled to the second section in a plane which is generally perpendicular to the longitudinal axis of the main conduit, and the second section may rotate a full 360 degrees with respect to the first section. The third section is rotatably coupled to the second section in a plane which forms an oblique angle with the longitudinal axis of the main conduit. The additional degree of freedom provided by the three sections allows for more precise adjustments of the fitting.

In the preferred embodiment, the invention further comprises a branch conduit securely connected to the main conduit. The branch conduit comprises at least two sections which each have an inner tubular member and a concentric outer tubular member which together form the double walls of the branch conduit. The branch sections are coupled together in planes forming oblique angles with the longitudinal axis of the branch section and thus allow the branch conduit to be adjusted to accommodate various angles and orientations of connector pipes. In this preferred embodiment, the adjustable fitting provides great flexibility for joining the ends of three randomly oriented pipes. Additional pipes may be joined by merely constructing the adjustable fitting with additional branch conduits connected to the main conduit.

BRIEF DESCRIPTION OF THE DRAWINGS

A more complete understanding of the invention and its advantages will be apparent from the following Detailed Description taken in conjunction with the accompanying drawings, in which:

FIG. 1 illustrates an adjustable pipe fitting of the invention used to connect the vents of two gas-burning appliances to a common exhaust vent.

FIG. 2 is a side view of the preferred embodiment of the invention.

DETAILED DESCRIPTION

Figure 3:
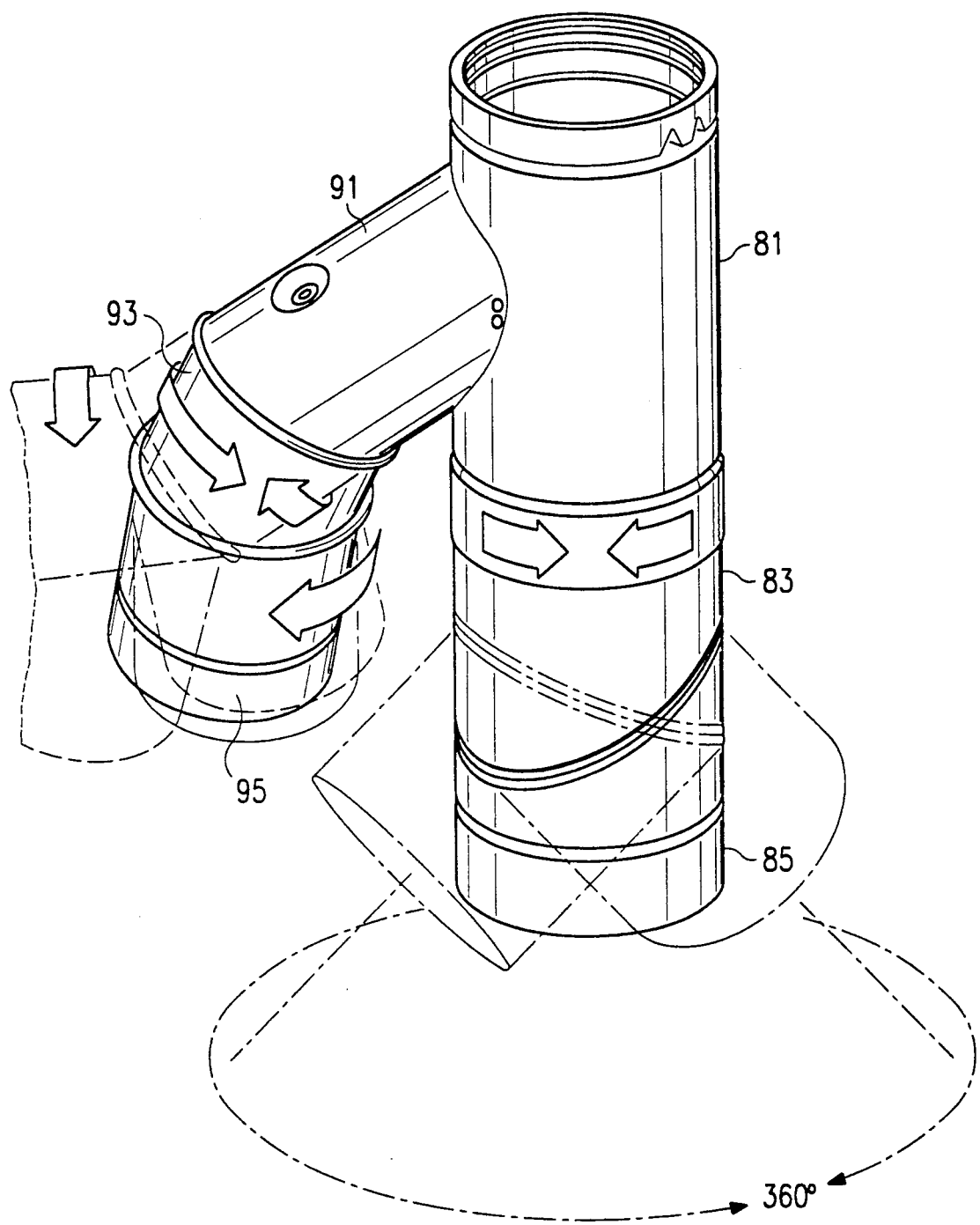
FIG. 3 illustrates various positions to which the main conduit and branch conduit of the adjustable fitting can be rotated.

The preferred embodiment of the invention is shown in a typical application in FIG. 1. The adjustable pipe fitting is depicted generally at 21. The invention comprises tubular main conduit 23 having first end 25 and second end 27. Tubular branch conduit 29 comprises proximal end 31 and distal end 33. Proximal end 31 is securely connected to main conduit 23, and the interior of branch conduit 29 is in fluid communication with the interior of main conduit 23.

In the particular application shown in FIG. 1, adjustable pipe fitting 21 is used to facilitate the connection of vent pipes running from two gas appliances to common exhaust vent 41. Connector pipe 47 extends from first appliance 45 and is joined to second end 27 of main conduit 23. Connector pipe 65 extends from second appliance 63 and is joined to distal end 33 of branch conduit 29. For example, first appliance 45 may be a heating furnace and second appliance 63 may be a water heater; however, the particular types of appliances are not of critical importance to the invention. The adjustable pipe fitting 21 may be used in any application requiring the venting of gas or other combustion products. First end 25 of main conduit 23 is similarly joined to common exhaust vent 41. Connector pipes 47 and 65, common exhaust vent 41, and adjustable fitting 21 all have double walls, as required by ANSI/UL Type B specifications.

Although in the application shown in FIG. 1, the invention is used to connect two appliances to the common exhaust vent 41, the invention may also be used to connect a single appliance to the vent. In this embodiment, the invention will comprise only main conduit 23, as there would be no need for branch conduit 29. Alternatively, the invention may be used to connect more than two appliances to common vent 41. In this alternative embodiment, the invention will comprise two or more branch conduits having their proximal ends attached to main conduit 23. Each appliance would be connected to either the distal end of one of the branch conduits or to second end 27 of main conduit 23.

A more detailed view of the preferred embodiment of the adjustable pipe fitting is shown in FIG. 2. Tubular main conduit 23 comprises first main section 81, second main section 83, and third main section 85. Second main section 83 is rotatably coupled to first main section 81 in a plane which is generally perpendicular to longitudinal axis 143 of first main section 81. Second main section 83 can rotate about its longitudinal axis 147 a full 360 degrees relative to first main section 81. Because second main section 83 is coupled to first main section 81 in a perpendicular plane, longitudinal axis 147 remains aligned with longitudinal axis 143 as second main section 83 rotates relative to first main section 81.

Third main section 85 is rotatably coupled to second main section 83 in a plane which forms oblique angle A with longitudinal axis 147 of second main section 83. An oblique angle is defined herein as an angle which is neither perpendicular nor parallel. A preferred oblique angle A is approximately 67.5 degrees, although other angles less than 90 degrees are also suitable. It will be apparent to those skilled in the art that when oblique angle A is approximately 67.5 degrees, third main section 85 may be rotated relative to second main section 83 so that longitudinal axis 153 of third main section 85 forms an approximately 135 degree angle with longitudinal axis 147. Smaller magnitudes of oblique angle A will produce corresponding smaller resulting angles between longitudinal axis 153 and longitudinal axis 147.

Proximal end 31 of branch conduit 29 is securely connected to the side of main conduit 23 in a manner which allows gas and other combustion products to flow freely between branch conduit 29 and main conduit 23. While proximal end 31 is shown connected to the side of first main section 81 in FIG. 2, it may also be connected at other locations along the length of main conduit 23. Branch conduit 29 comprises first branch section 91, second branch section 93, and third branch section 95. Longitudinal axis 231 of first branch section 91 forms angle B with the longitudinal axis 143 of first main section 81. A preferred angle B is 60 degrees, as indicated in FIG. 2. However, the magnitude of angle B is not critical, and other magnitudes between approximately 20 and 90 degrees are also suitable.

Second branch section 93 is rotatably coupled to first branch section 91 in a plane forming oblique angle C (FIG. 6) with longitudinal axis 231 of first branch section 91. A preferred magnitude for oblique angle C is approximately 75 degrees, but other magnitudes less than 90 degrees may also be used. Similarly, third branch section 95 is rotatably coupled to second branch section 93 in a plane forming oblique angle D (FIG. 6) with the longitudinal axis 237 of second branch section 93. While other magnitudes less than 90 degrees are also suitable, a magnitude of approximately 75 degrees is preferred for oblique angle D.

Second branch section 93 can be rotated a full 360 degrees relative to first branch section 91, and third branch section 95 can be rotated a full 360 degrees relative to second branch section 93. It will be apparent to those skilled in the art that as these branch sections are rotated relative to each other, the preferred magnitudes of oblique angles B, C, and D allow the branch conduit 29 to be adjusted so that longitudinal axis 241 (FIG. 6) of third branch section 95 is approximately perpendicular to longitudinal axis 143 of first main section 81. The branch conduit 29 may further be adjusted by rotating the branch sections relative to each other so that longitudinal axis 241 is approximately parallel to longitudinal axis 143.

The means for adjusting main conduit 23 and branch conduit 29 and their ranges of movement are more clearly shown in FIG. 3. Third main section 85 may be rotated with respect to second main section 83, thereby causing longitudinal axis 153 (FIG. 2) to form an angle relative to longitudinal axis 147 (FIG. 2). Additionally, second main section 83 can be rotated in a plane generally perpendicular to longitudinal axis 143 (FIG. 2). This allows second end 27 of main conduit 23 to accommodate a wide range of possible connector pipe orientations.

As additionally shown in FIG. 3, when third main section 85 is rotated relative to second main section 83 as a means for adjusting main conduit 23, second end 27 occupies a plane which forms a corresponding oblique angle with the plane containing first end 25. This is because first end 25 is generally perpendicular to longitudinal axes 143 and 147. Similarly, second end 27 is generally perpendicular to longitudinal axis 153. Thus, when main conduit 23 is adjusted so that longitudinal axis 153 forms an oblique angle relative to longitudinal axes 143 and 147, second end 27 also forms an oblique angle with first end 25.

Furthermore, second branch section 93 may be rotated as shown in FIG. 3 relative to first branch section 91. Third branch section 95 likewise may rotate relative to second branch section 93. It may be seen in FIG. 3 that branch conduit 29 may be adjusted in this manner so that longitudinal axis 241 (FIG. 6) of third branch section 95 can assume a wide range of orientations from generally parallel to main conduit 23 to generally perpendicular to main conduit 23.

Figure 4A:
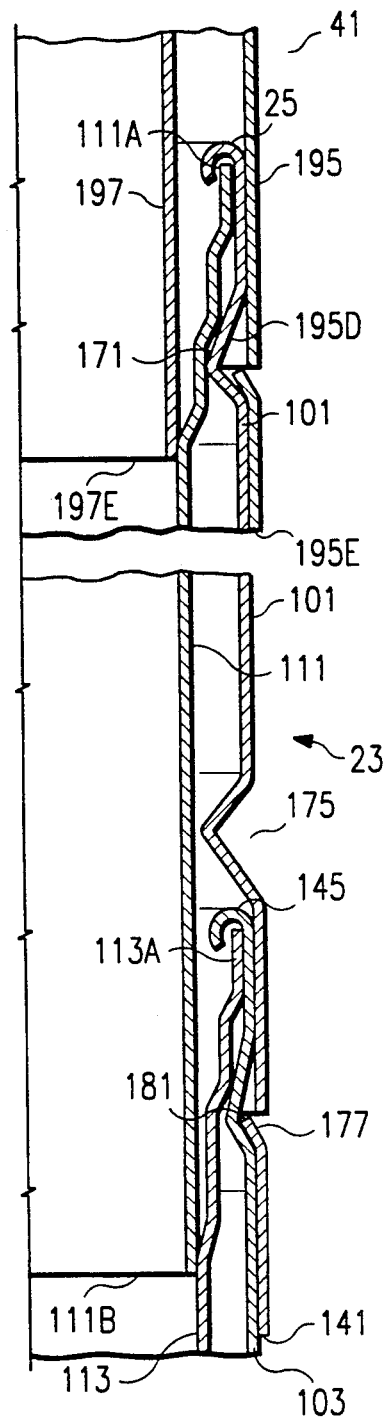
FIGS. 4A and 4B are partial cross-sectional views of the main conduit of the adjustable fitting. The bottom of FIG. 4A is continuous with the top of FIG. 4B to illustrate in detail the structure of the double walls of the main conduit.
Figure 4B:
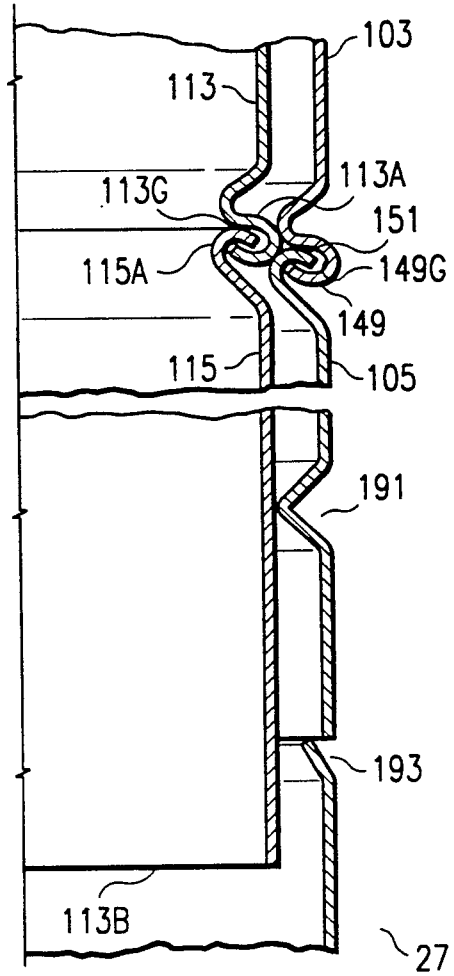
Figure 6:
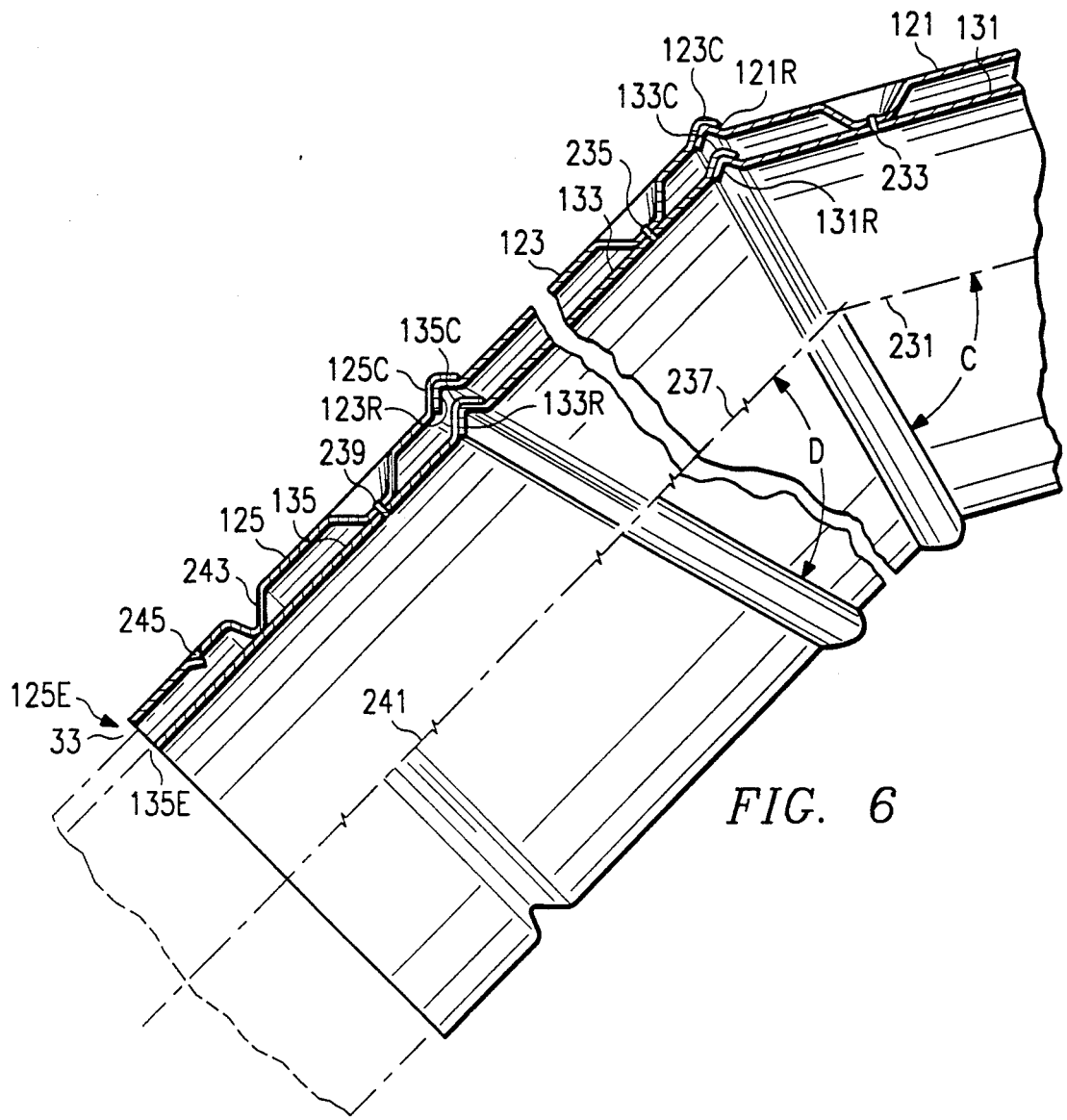
FIG. 6 is a partial cross-sectional view taken along line 6—6 in FIG. 1 and showing in detail the structure of the double walls of the branch conduit.

The double walls of adjustable pipe fitting 21 are shown best in FIGS. 4A, 4B and 6. As shown in FIGS. 4A and 4B, the main conduit 23 comprises outer tubular members 101, 103, and 105 and inner tubular members 111, 113, and 115. Inner tubular members 111, 113, and 115 are spaced inward of and fixedly connected to outer tubular members 101, 103, and 105, respectively. Outer tubular members 101, 103, and 105 are concentric with inner tubular members 111, 113, and 115. As shown in FIG. 6, the branch conduit 29 comprises outer tubular members 121, 123, and 125 and inner tubular members 131, 133, and 135. Inner tubular members 131, 133, and 135 are spaced inward of and fixedly connected to outer tubular members 121, 123, and 125, respectively. Outer tubular members 121, 123, and 125 are concentric with inner tubular members 131, 133, and 135. Thus, the main conduit 23 and the branch conduit 29 meet ANSI/UL Type B specifications.

First end 25 of members 101 and 111 can be coupled to the common exhaust vent 41 to rotate 360 degrees relative to the vent. Members 103 and 113 can rotate 360 degrees relative to members 101 and 111 with their axes aligned. Members 105 and 115 can rotate relative to members 103 and 113 so that longitudinal axis 153 is aligned with longitudinal axis 147 or forms an angle relative to longitudinal axis 147.

Branch members 121 and 131 are fixedly coupled to main conduit members sections 101 and 111 around an opening formed through the walls thereof. Branch members 123 and 133 can rotate 360 degrees relative to members 121 and 131, and branch members 125 and 135 can rotate 360 degrees relative to branch members 123 and 133 to locate longitudinal axis 241 generally perpendicular or generally parallel to longitudinal axis 143.

The outer tubular member 101 comprises the first end 25 and a second end 141 located in planes generally perpendicular to its longitudinal axis 143. The outer tubular member 103 comprises a first end 145 located in a plane generally perpendicular to its longitudinal axis 147 and a second end 149 located in a plane which forms oblique angle A relative to longitudinal axis 147. The ends 141 and 145 of members 101 and 103, respectively, are coupled together for rotation 360 degrees about their respective axes 143 and 147 which remain aligned. Inner members 111 and 113 rotate with outer members 101 and 103, respectively.

The outer member 105 comprises a first end 151 located in a plane which forms an oblique angle relative to longitudinal axis 153 which is approximately equal in magnitude to oblique angle A. The second end 27 of member 105 is in a plane generally perpendicular to its longitudinal axis 153. The ends 149 and 151 of outer members 103 and 105 are coupled together for rotation 360 degrees relative to each other such that their respective axes 147 and 153 may be in alignment with each other or at an oblique angle relative to each other. Inner members 113 and 115 rotate in conjunction with outer members 103 and 105, respectively.

The first end 25 of member 101 is bent around and clamped to the end 111A of member 111 to fixedly secure the two members together. Most of the remaining portions of members 101 and 111 are spaced apart forming an air gap between their walls. Member 101 has an inwardly extending annular groove 171 formed in its wall and which extends in a plane generally perpendicular to its longitudinal axis 143. In addition, three generally equally spaced longitudinal grooves 173 extend from the end 25 to the groove 171 (FIG. 2). Adjacent grooves 173 are located approximately 120 degrees apart. Another inwardly extending annular groove 175 is formed in member 101 near its second end 141 to strengthen the end portion 141 and to support the inner member 111. In addition, six generally equally spaced dimples 177 located in a plane generally perpendicular to longitudinal axis 143 are formed in member 101 near its end 141. Adjacent dimples 177 are equally spaced around member 101. The ends 141 and 111B of members 101 and 111 are spaced apart to receive the end 145 of member 103.

Figure 5:
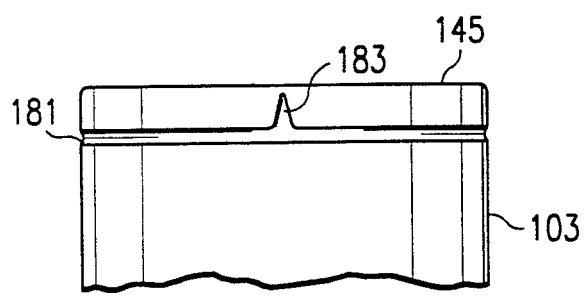
FIG. 5 is a side view of the first end of the second section of the main conduit of the adjustable fitting.

The first end 145 of member 103 is bent around and clamped to the end 113A of member 113 to fixedly secure the two members together. The remaining portions of members 103 and 113 are spaced apart forming an air gap between their walls. Member 103 has an inwardly extending annular groove 181 formed in its wall and which extends in a plane generally perpendicular to its longitudinal axis 147 (FIG. 5). In addition, three generally equally spaced longitudinal grooves 183 extend from end 145 to the groove 181. Adjacent grooves 183 are equally spaced around member 103.

The ends 141 and 145 of the two members 101 and 103, respectively, can be rotatably coupled together by aligning the three grooves 183 with three of the six dimples 177 and inserting end 145 between the ends 141 and 111B of members 101 and 111 until the six dimples 177 are located in the groove 181. The two members 101 and 103 then can be rotated relative to each other with the dimples 177 located in the groove 181 which allows 360 degree rotation. The two members 101 and 103 are held together and prevented from disconnecting because there are more dimples 177 than grooves 183. Thus, as the members 101 and 103 rotate relative to each other, there are always some dimples 177 which are not aligned with grooves 183 and which prevent members 101 and 103 from separating.

The ends 149 and 113A of members 103 and 113 are S-shaped in cross-section forming two inward facing grooves 149G and 113G, respectively, which extend in a plane forming oblique angle A with longitudinal axis 147. The ends 151 and 115A of members 105 and 115, respectively, are C-shaped in cross-section and extend in a plane which forms an angle relative to longitudinal axis 153 which is approximately equal in magnitude to oblique angle A. The C-shaped ends 151 and 115A of members 105 and 115 are located in the grooves 149G and 113G of members 103 and 113, respectively, to allow the members 103, 113 and 105, 115 to rotate relative to each other to positions such that their longitudinal axes 147 and 153 are aligned or form an oblique angle relative to each other.

Member 105 has an annular groove 191 formed in its wall near second end 27 for strengthening purposes and for supporting member 115. Member 105 also has three generally equally spaced dimples 193 located in a plane near second end 27. Adjacent dimples 193 are equally spaced apart. The ends 27 and 113B of members 105 and 115 are spaced apart to receive the end of connector pipe 47 which will have an end similar to that of end 145 of member 103 with an annular groove 181 and three grooves 183 for receiving the dimples 193 and allowing the connector pipe 47 to rotate 360 degrees relative to members 105 and 115 with their axes aligned. Connector pipe 47 meets ANSI/UL Type B specifications.

The common exhaust vent 41 also is a Type B vent which has outer and inner tubular members 195 and 197 with their ends 195E and 197E, respectively, spaced apart for receiving the end 25 of member 101. Member 195 has three spaced apart dimples 195D located in a plane. Adjacent dimples 197D are equally spaced apart. The end 25 of members 101 and 111 may be inserted between the ends 195E and 197E of members 195 and 197 with the dimples 195D aligned with grooves 173 to locate the dimples 195D in annular groove 171. This allows the members 101 and 111 to be rotatably coupled to the common exhaust vent 41 and allows it to be rotated 360 degrees relative to the vent 41.

Figure 7:
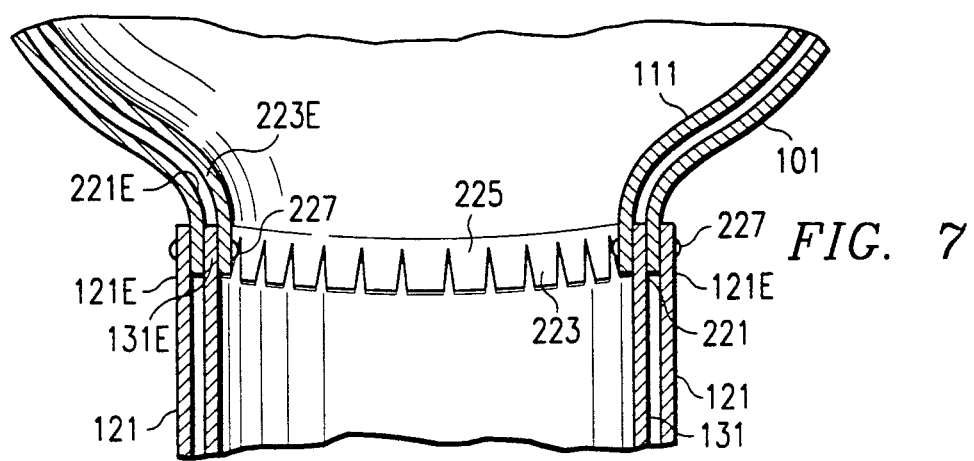
FIG. 7 is a partial cross-sectional view taken along the line 7—7 in FIG. 2.

Referring now to FIG. 7, the members 101 and 111 have two aligned circular openings 221 and 223 formed therethrough. The edge 221E of the member 101 around the opening 221 is bent outward and the edge 223E of the member 111 around opening 223 is cut at a plurality of places to form tabs 225 which also are bent outward. The end 121E of branch member 121 is located around the edge 221E of member 101 and the end 131E of branch member 131 is located between edge 221E and tabs 225. The ends 121E and 131E of members 121 and 131 are fixedly attached to the edges 221E and 223E of members 101 and 111 with rivets 227 such that the interior of member 131 is in fluid communication with the interior of member 111.

As shown in FIG. 6, the branch members 121 and 131 are also fixedly secured together by rivets 233. The distal ends of branch members 121 and 131 are bent to form annular rims 121R and 131R, respectively, which are located in a plane which forms oblique angle C relative to longitudinal axis 231 of the members 121 and 131.

Members 123 and 133 are fixedly connected together by rivets 235. Their proximal ends form complementary annular rims 123C and 133C, respectively, which are located in a plane which forms an angle relative to longitudinal axis 237 which is equal in magnitude to oblique angle C. The annular rims 121R and 131R of members 121 and 131 are coupled to complementary annular rims 123C and 133C of members 123 and 133, respectively, such that members 123 and 133 can rotate 360 degrees relative to members 121 and 123 to form different angles between their axes 231 and 237.

The distal ends of members 123 and 133 are bent to form annular rims 123R and 133R which are located in a plane which forms oblique angle D relative to the longitudinal axis 237.

Members 125 and 135 are fixedly connected together by rivets 239. Their proximal ends form complementary annular rims 125C and 135C which are located in a plane which forms an angle relative to longitudinal axis 241 which is equal in magnitude to oblique angle D. The annular rims 123R and 133R of members 123 and 133 are coupled to complementary annular rims 125C and 135C such that members 125 and 135 can rotate 360 degrees relative to members 123 and 133 to form different angles between their axes 241 and 237.

An annular groove 243 is formed in member 125 for strengthening purposes and for support of member 135. Member 125 has three generally equally spaced dimples 245 located in a plane near its end 125E. The distal ends 125E and 135E of members 125 and 135 are spaced apart to receive the end of connector pipe 65.

The adjustable pipe fitting 21 of the invention may have many different dimensions. In one embodiment, the distance between the ends 25 and 27 of the main conduit 23 may be 16 inches with an inside diameter of the main conduit 23 being 5 inches and the outside diameter of the main conduit 23 being 5¼ inches. The inside diameter of the branch 29 may be 4 inches and the outside diameter of the branch 29 may be 4¼ inches.

Each of members 101, 111, 103, 113, 105, 115, 121, 131, 123, 133, 125, and 135 is fabricated from a sheet of material folded to a tubular shape with the two ends connected together to form a seam extending along the length of the resulting tubular member.

Although the preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit and scope of the invention. The invention is therefore intended to encompass such rearrangements, modifications, and substitutions of parts and elements.

What is claimed is:

1. An adjustable pipe fitting for connecting misaligned pipes, comprising:
    a main conduit having first and second main segments, each of which has concentric inner and outer tubular members, said main conduit having a rotatable joint intermediate its ends, the plane of rotation of said joint being at an oblique angle to the longitudinal axis of the main conduit so that the second end of said conduit can be rotated from a position where the longitudinal axes of the two main segments are aligned to positions where they intersect at oblique angles; and a branch conduit having first, second and third branch segments, each of which has concentric inner and outer tubular members, the first branch segment having a proximal end connected to the first main segment of the main conduit, the first branch segment extending from the first segment of the main conduit at an oblique angle relative thereto and towards the second segment of the main conduit, said first and second segments being joined together by a first rotatable joint and said second and third branch segments being joint together by a second rotatable joint, the plane of rotation of the first rotatable joint being at an oblique angle to the longitudinal axis of the branch conduit and to the plane of rotation of the second rotatable joint so that said second and third branch segments may be rotated relative to each other and to said first branch segment from a position where the longitudinal axes of said first, second, and third branch segments are aligned to positions where the longitudinal axes of said first, second and third branch segments form oblique angles with each other.

2. An adjustable pipe fitting for connecting at least two misaligned pipes, comprising:
- a first main section having a side wall, a first end, and a second end, the side wall of the said first main section having an inner tubular member and a concentric outer tubular member;
- a second main section having a side wall, a first end, and a second end, the side wall of said second main section having an inner tubular member and a concentric outer tubular member, the first end of said second main section rotatably coupled to the second end of said first main section,
- a third main section having a side wall, a first end, and a second end, the side wall of said third main section having an inner tubular member and a concentric outer tubular member, the first end of said third main section rotatably coupled to the second end of said second main section in a plane forming an oblique angle with the longitudinal axis of said second main section;
- a first branch section having a side wall, a proximal end, and a distal end, the side wall of said first branch section having an inner tubular member and a concentric outer tubular member, the proximal end of said first branch section attached to said first main section so that fluid communication exists between the interior of said first branch section and the interior of said first main section;

the first branch section extending from the main section at an oblique angle relative thereto and toward the second main section;
- a second branch section having a side wall, a proximal end, and a distal end, the side wall of said second branch section having an inner tubular member and a concentric outer tubular member, the proximal end of said second branch section rotatably coupled to the distal end of said first branch section in a plane forming an oblique angle with the longitudinal axis of said first branch section; and
- a third branch section having a side wall, a proximal end, and a distal end, the side wall of said third branch section having an inner tubular member and a concentric outer tubular member, the proximal end of said third branch section rotatably coupled to the distal end of said second branch section in a plane forming an oblique angle with the longitudinal axis of said second branch section.

3. An adjustable pipe fitting for connecting at least two misaligned pipes as recited in claim 2, wherein:
said second main section comprises a first flange having a S-shaped cross-section located on the second end of the inner tubular member, and a second flange having an S-shaped cross-section located on the second end of the outer tubular member; and
said third main section comprises a third flange having a C-shaped cross-section located on the first end of the inner tubular member and rotatably engaged with said first flange, and a fourth flange having a C-shaped cross-section located on the first end of the outer tubular member and rotatably engaged with said second flange.

4. An adjustable pipe fitting for connecting at least two misaligned pipes as recited in claim 3, wherein:
said first branch section comprises a first annular rim located on the distal end of the inner tubular member, and a second annular rim located on the distal end of the outer tubular member;
said second branch section comprises a first complementary annular rim located on the proximal end of the inner tubular member and rotatably engaged with said first annular rim, a second complementary annular rim located on the proximal end of the outer tubular member and rotatably engaged with said second annular rim, a third annular rim located on the distal end of the inner tubular member, and a fourth annular rim located on the distal end of the outer tubular member; and
said third branch section comprises a third complementary annular rim located on the proximal end of the inner tubular member and rotatably engaged with said third annular rim, and a fourth complementary annular rim located on the proximal end of the outer tubular member and rotatably engaged with said fourth annular rim.

* * * * *